United States Patent
Pokorný et al.

(10) Patent No.: US 11,828,047 B2
(45) Date of Patent: *Nov. 28, 2023

(54) APPARATUS FOR EXTRACTING WATER FROM AIR WITH ONE AIR DUCT

(71) Applicant: Czech Technical University in Prague, Prague-Dejvice (CZ)

(72) Inventors: Nikola Pokorný, VysokýÚjezd (CZ); Viacheslav Shemelin, Hloubětín (CZ); Tomáš Matuška, Michle (CZ)

(73) Assignee: Czech Technical University in Prague, Prague (CZ)

( * ) Notice: Subject to any disclaimer, the term of this patent is extended or adjusted under 35 U.S.C. 154(b) by 126 days.

This patent is subject to a terminal disclaimer.

(21) Appl. No.: 17/196,325

(22) Filed: Mar. 9, 2021

(65) Prior Publication Data
US 2021/0285189 A1  Sep. 16, 2021

(30) Foreign Application Priority Data
Mar. 10, 2020  (CZ) ................................ CZ2020-127

(51) Int. Cl.
*E03B 3/28* (2006.01)

(52) U.S. Cl.
CPC ...................... *E03B 3/28* (2013.01)

(58) Field of Classification Search
CPC .... B01D 5/0003; B01D 5/0075; B01D 5/009; B01D 2257/80; E03B 3/28; F25B 15/00
See application file for complete search history.

(56) References Cited

U.S. PATENT DOCUMENTS

2021/0055010 A1* 2/2021 McGrail ................. F24F 3/153

FOREIGN PATENT DOCUMENTS

| CZ | 307873 | 7/2019 |
|----|--------|--------|
| EP | 2181743 | 5/2010 |

(Continued)

OTHER PUBLICATIONS

Kim H, Yang S, Rao SR, Narayanan S, Kapustin EA, Furukawa H, et al. Water harvesting from air with metal-organic frameworks powered by natural sunlight. Science (80- ) 2017;356:430-4.

(Continued)

*Primary Examiner* — Elizabeth J Martin
(74) *Attorney, Agent, or Firm* — Riverside Law LLP

(57) ABSTRACT

The apparatus comprises an air duct with a first opening and a second opening. In the air duct, a main cooler and a first block of exchangers with at least one first sorption exchanger with an integrated heating and/or an upstream device for heating the incoming air, are positioned. The first block of exchangers is connected to the first opening. It comprises a suction unit for drawing air into the air duct and an element for collecting condensed water. The suction unit is adapted to switch between two different suction directions. The apparatus also comprises a second block of exchangers with at least one second sorption exchanger positioned in the air duct and air-interconnected to the second opening. A main cooler is positioned in the air flow path between the first block of exchangers and the second block of exchangers. The second sorption exchangers comprise integrated heating and/or are preceded upstream by at least one device for heating the entering air.

14 Claims, 6 Drawing Sheets

(56) References Cited

FOREIGN PATENT DOCUMENTS

WO  2016081863  5/2016
WO  2016198991  12/2016

OTHER PUBLICATIONS

Tu R, Hwang Y. Performance analyses of a new system for water harvesting from moist air that combines multi-stage desiccant wheels and vapor compression cycles. Energy Convers Manag 2019;198:111811.
Wang JY, Wang RZ, Tu YD, Wang LW. Universal scalable sorption-based atmosphere water harvesting. Energy 2018;165:387-95.
Wang JY, Wang RZ, Wang LW, Liu JY. A high efficient semi-open system for fresh water production from atmosphere. Energy 2017;138:542-51.

\* cited by examiner

APPARATUS FOR EXTRACTING WATER FROM AIR WITH ONE AIR DUCT

CROSS-REFERENCE TO RELATED APPLICATIONS

This application claims priority to Czech Patent Application No. 2020-127, filed on Mar. 10, 2020, issued as Czech Patent No. 308656 on Dec. 17, 2020, incorporated herein by reference in its entirety.

FIELD OF THE INVENTION

The invention relates to a mobile and, in some possible embodiments, autonomous apparatus allowing water production from the air even in desert climatic conditions, in a very small and compact design.

BACKGROUND

Several apparatuses are currently available on the market operating on the principle of cooling the ambient air by an exchanger with a temperature lower than the dew point temperature, wherein water vapor from the air condensates on its surface in the form of water droplets. The disadvantage of such a solution is that in the case of low specific humidity of the ambient air below 5 g/kg of dry air, the water production is very low and at the same time energy-intensive. Therefore, for example, in desert conditions, conventional units for producing water from atmospheric humidity simply by cooling below the dew point do not produce any water.

Therefore, the effort is to develop an apparatus that would be sufficiently effective even in drier conditions. To a small extent, apparatuses are beginning to appear using an adsorbent material to humidify the air prior to cooling below the dew point temperature. The disadvantage of the until now known apparatuses of this type is the still relatively high energy consumption.

The apparatus according to the application WO 2016/187709 for obtaining water from the air uses a sorption system for dehumidification and humidification of the exterior air. Here, two main embodiments are described with a desiccant wheel and with a sorption material in a cage which is heated by a heater. The disadvantage of the apparatus in the embodiment with the sorption material in a cage is that it produces water only in one pass of air through the apparatus and adsorption of atmospheric humidity in the second pass, which has a negative effect on the production of water. External sources are used for heating the sorption exchanger in the embodiment with a desiccant wheel as well as with sorption material in a cage, which leads to an increase in dimensions, no manner has been proposed to miniaturize the sorption exchanger heating device. The proposed external heat sources are various, from waste heat from exhaust gases to heat from solar collectors. However, these are always external sources, all the heat supplied to the sorption exchanger comes from equipment outside of the system, no system is used for heat recovery in the apparatus itself. This results in high energy consumption. The heat from cooling remains unused, and no cold recovery is described. Therefore, only its connection to the distribution network is proposed and described in the application. In the apparatus according to WO 2016/187709, the use of only one sorption unit is proposed, the possibility of increasing water production by regeneration and adsorption on two sorption exchangers simultaneously is not considered.

The apparatus according to the application WO 2006029249 for obtaining water from air does not use a sorption system for removing humidity from the air. The patent describes several principles for cooling air below the dew point temperature, such as compressor or absorption cooling. The main disadvantage is the very small production of water in desert climatic conditions, compared to the proposed apparatus.

The apparatus according to the patent application US 2006/0272344 uses a sorption system based on a sorption wheel with a solid desiccant with a closed regeneration circuit. Only waste heat from an internal combustion engine of a mobile device is used to regenerate the desiccant, so again no heat recovery related to the operation of the system is considered. Similarly to above, there is a sorption wheel that consumes extra electricity because it has to rotate between two positions. The apparatus utilizes 2 air ducts, which is disadvantageous both in terms of size and energy, as related to the electricity consumption of the two suction devices. The dehumidified process air existing the sorption wheel serves as a source of cold for the condensing exchanger, where water vapor is precipitated from the humidified air. The disadvantage of such a device is that it can only operate in cold or humid areas where the temperature of the dehumidified process air is sufficiently below the dew point temperature of the humidified air.

The apparatus according to the U.S. Pat. No. 7,601,208 uses a liquid desiccant to remove moisture from the air. First, the liquid desiccant removes humidity from the air stream by spraying. Then water separates from the desiccant solution by evaporation. The source of heat for evaporation is the waste heat from the internal combustion engine of a mobile device, the apparatus does not propose any heat recovery system. Subsequently, water vapor condenses in the condenser, where the source of cold is the exterior air drawn in. A clear disadvantage of such a device is that in order for water vapor to condense, the ambient air temperature needs to be sufficiently below the dew point temperature for water to condense in the cooler. Thus, even this apparatus cannot operate in desert conditions where the air temperatures are usually high.

The apparatus according to the patent application US 2011/0296858 uses a desiccation system with a sorption wheel with a solid desiccant. The exterior air drawn in passes through a sorption wheel and water vapor is adsorbed on the desiccation surface. Subsequently, the already dehumidified air is heated in a microwave chamber to a high temperature and routed back to the desiccator wheel for its regeneration. Next, the humidified air comes to a cooler, where water vapor condenses. However, it is not clear from the patent what advantage this apparatus with a desiccant wheel has over a conventional condensing apparatus, because the apparatus works with the same process and regenerating air flow, so there is no increase in humidity before condensation. The apparatus works with the same efficiency of obtaining water from air as a conventional condensing apparatus. Therefore, in desert areas, with very low efficiency. In addition, it is dimensionally and energy intensive.

The apparatus according to the patent CZ307873 uses a desiccation system with a sorption wheel with a solid desiccant. The apparatus is designed as autonomous. The exterior air drawn in passes through a sorption wheel and water vapor is adsorbed on the desiccation surface. The apparatus uses a refrigerant circuit to heat the regenerating air and to cool the air below the dew point, which is advantageous for the overall energy balance. The humidified air comes to a cooler, where water vapor condenses. The disadvantage of such a device is the concept of two air streams, i.e. the operation of two suction devices compared to the single-stream design. In addition, this device requires electrical energy to drive the desiccator wheel. Another disadvantage is the space requirement of the device, which results from the presence of the desiccator wheel and two air ducts, limiting the possibilities of device implementation in a compact design.

The apparatus according to the patent application US 2018/0043295 is fully autonomous and uses a desiccation system with two sorption wheels. In a closed circuit, the regenerating air is heated in an air-heating solar collector, simultaneously the air is repeatedly humidified by the two desiccant wheels. After reaching the regeneration temperature, air humidity starts to condense on the lamellas of the air-air heat exchanger, where, on the other side ambient air flows, which is concurrently used as process air. The disadvantage of such a device is the concept of two air streams, i.e. the operation of two suction devices and the space-consuming presence of two air ducts. Another disadvantage is also the operation of two desiccator wheels. Also disadvantageous is the absence of a refrigerant circuit and thus the reduced production of condensed water, especially in a desert environment, where the air temperature is often higher than the dew point temperature.

Thus, the disadvantage of the solutions known from prior art is the scope of application limited either to areas with high humidity or to areas with low ambient air temperature. In the case of dry warm areas such as deserts, some apparatuses exhibit low water production or high demand for external (non-renewable) energy supply. Some apparatuses may, however, produce more water in desert areas, but only at the cost of higher energy consumption. None of the apparatuses are able to meet simultaneously the requirement for more efficient production of water in desert areas, the requirement for autonomous operation without using external (non-renewable) energy supply, the requirement of low energy consumption, and the requirement for compact mobile embodiment.

SUMMARY OF THE INVENTION

The disadvantages mentioned above are eliminated by an apparatus for extracting water from air with one air duct according to the present invention. It offers higher water production due to the simultaneous adsorption and regeneration on two sorption exchangers, simultaneously the proposed apparatus advantageously recovers heat from cooling to heat the entering air and also recovers cold from a cooler in a recuperative heat exchanger to pre-cool the air coming from the sorption exchanger to the cooler. In addition, the apparatus offers minimization of dimension because of features such as the internal source of energy grated heating in sorption exchangers or the placement of all air handling units in one air duct, high efficiency with low energy consumption due to a combination of heat and cold recovery methods, and also the possibility of fully autonomous operation.

This apparatus for extracting water from air with one air duct comprising an air duct having a first opening for air intake and/or exhaust and also a second opening for air intake and/or exhaust, whereas in this air duct the main air cooler for cooling the air in the air duct and a first block of exchangers with at least one first sorption exchanger are located. At least one of these first sorption exchangers comprises integrated heating and/or the sorption exchangers are preceded upstream by at least one entering air heating device. The first block of heat exchangers is air-connected directly or via other elements to the first air duct opening, the apparatus also comprising a suction unit for drawing air into the air duct comprising at least one suction device. The apparatus also comprises at least one element for collecting condensed water. The principle of this apparatus is that the suction unit is adapted to switch between two different directions of air drawn into the air duct and that it further comprises a second block of exchangers with at least one second sorption exchanger. This second block of heat exchangers is positioned in the air duct and is air-interconnected directly or via other elements to the second air duct opening, the main cooler being positioned in the air flow path between the first block of heat exchangers and the second block of heat exchangers for both air suction directions into the air duct. At least one of the second sorption exchangers comprises integrated heating and/or upstream of the second sorption exchangers, at least one air heating device is positioned.

It is advantageous to complement the apparatus with a refrigerant circuit with a refrigerant piping, a refrigerant, an expansion valve, and a compressor, to which the main cooler is connected as a refrigerant evaporator. This main cooler is also connected to the first block of heat exchangers and the second heat exchanger block via the refrigerant piping and the switching mechanism for switching the refrigerant flow direction, the two blocks of heat exchangers being also interconnected to each other by the refrigerant piping.

The first block of heat exchangers may, with an advantage, also comprise a first heater, via which this first block of heat exchangers is connected via the refrigerant piping to the switching mechanism. Similarly, the second block of heat exchangers may also comprise a second heater, via which this second block of heat exchangers is connected via the refrigerant piping to the switching mechanism, the mutual interconnection of the blocks of heat exchanger via the refrigerant piping being implemented as an interconnection of the said heaters.

For greater energy savings, it is suitable to complement the apparatus by a recuperative heat exchanger, which is positioned in the air duct between the main cooler and the first block of exchangers and simultaneously also between the main cooler and the second block of exchangers. This recuperative heat exchanger has at least two internal conduits connected in such manner, that the first of these internal conduits air-interconnects the first block of exchangers and the main cooler, and that the second of these internal conduits air-interconnects the main cooler to the second block of exchangers. The first and second internal conduits are in mutual thermal contact with one another.

In one possible embodiment, the refrigerant piping comprises branching in three directions, namely to the main cooler via the compressor, to the first block of heat exchangers and to the second block of heat exchangers. At the location of this branching in three directions, a switching mechanism designed as a three-way valve is implemented.

An embodiment is also possible in which the refrigerant piping comprises a branching in four directions, namely to the main cooler via a compressor, to the main cooler via an expansion valve, to a first air heater and to a second air heater. At the location of this branching in four directions, a switching mechanism designed as a four-way valve is implemented.

The embodiment just mentioned can be complemented by providing the air duct by a first flap for air-interconnection to the exterior, which is positioned between the first block of exchangers and the recuperative heat exchanger, and/or by providing the air duct with a second flap for air-interconnection to the exterior, positioned between the second block of exchangers and the recuperative heat exchanger.

It is advantageous if a first supplementary cooler for pre-cooling the exterior air is positioned between the first flap and the exterior and/or if a second supplementary cooler for pre-cooling the exterior air is positioned between the second flap and the exterior.

The apparatus may also comprise air-heating solar collectors and air piping. The supplementary coolers are then connected to the air-heating solar collectors via this air piping.

The suction unit may comprise a first suction device and a second suction device, wherein the first suction device is connected between the first air duct opening and the first block of heat exchangers and wherein the second suction device is connected between the second air duct opening and the second block of heat exchangers.

The apparatus can be complemented by a battery storage and at least one photovoltaic panel, the battery storage being electrically interconnected to at least one of the photovoltaic panels.

The apparatus may also comprise at least one liquid solar collector, the liquid solar collectors being thermal and/or photovoltaic-thermal. If photovoltaic-thermal collectors are present, these photovoltaic-thermal collectors are electrically interconnected to the battery storage.

The embodiment just mentioned may also comprise a liquid piping. Each of the liquid solar collectors is then connected by this liquid piping to the first block of exchangers and to the second block of exchangers.

The described apparatus achieves high water production with low energy consumption even in difficult desert conditions. Its advantages will be explained in more detail in the following embodiment examples.

BRIEF DESCRIPTION OF THE DRAWINGS

The invention is described in detail in the specific embodiments using the attached drawings.

All drawings depict the refrigerant circuit, which, however, is not necessary for the operation of the apparatus.

FIG. 1 differs from FIG. 2 in the reverse direction of flow through this air duct 1.

FIG. 1 depicts a situation in which the second sorption exchanger 2b in the second block 20b of exchangers is discharged.

FIG. 2 depicts a situation in which the first sorption exchanger 2a in the first block 20a of exchangers is discharged.

The embodiment in FIGS. 3 and 4 is supplemented by a recuperative heat exchanger 8 and heaters 4a, 4b in blocks 20a, 20b of exchangers.

FIG. 3 depicts a situation in which the first sorption exchanger 2a in the first block 20a of exchangers is discharged.

FIG. 5 depicts a situation in which the first sorption exchanger 2a in the first exchanger block 20a is discharged.

FIG. 6 depicts a situation in which the second sorption exchanger 2b in the second block 20b of exchangers is discharged.

In all of the above figures, longitudinal sections of the apparatus are shown.

DETAILED DESCRIPTION

The advantageous embodiments described below illustrate only some of the many possible solutions falling within the scope of the invention protection and illustrate the inventive idea. These are only selected advantageous arrangements that in no way limit the scope of protection of the invention.

Throughout this entire description, the term charging of the sorption exchanger means the adsorption of water on the sorption exchanger surfaces, the term discharging of the sorption exchanger means the desorption of water from the sorption exchanger surfaces.

Figure 1:
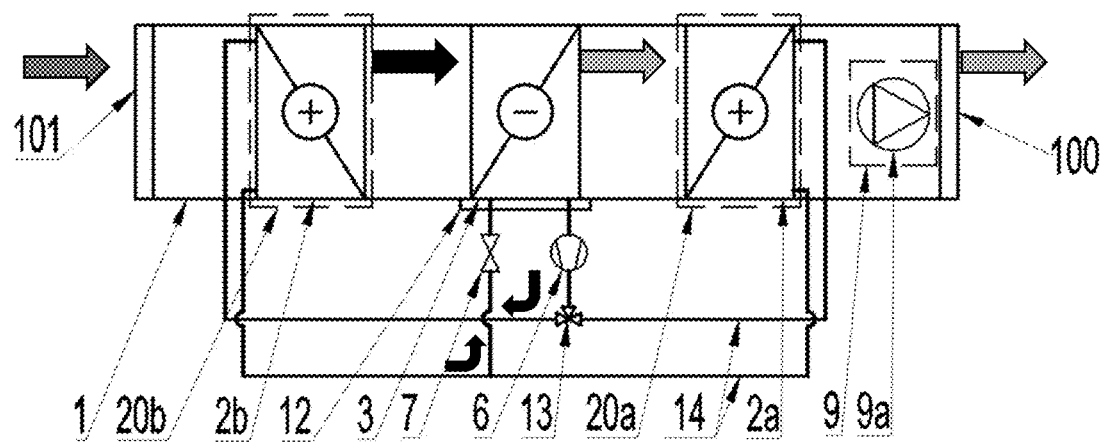
FIGS. 1 and 2 depict the simplest embodiment of the invention, the main elements of which are two blocks 20a, 20b of heat exchangers, each of which comprises at least one sorption exchanger, a main cooler 3 positioned between these blocks 20a, 20b of heat exchangers and a suction unit 9. All these said elements are positioned in an air duct 1.
Figure 2:
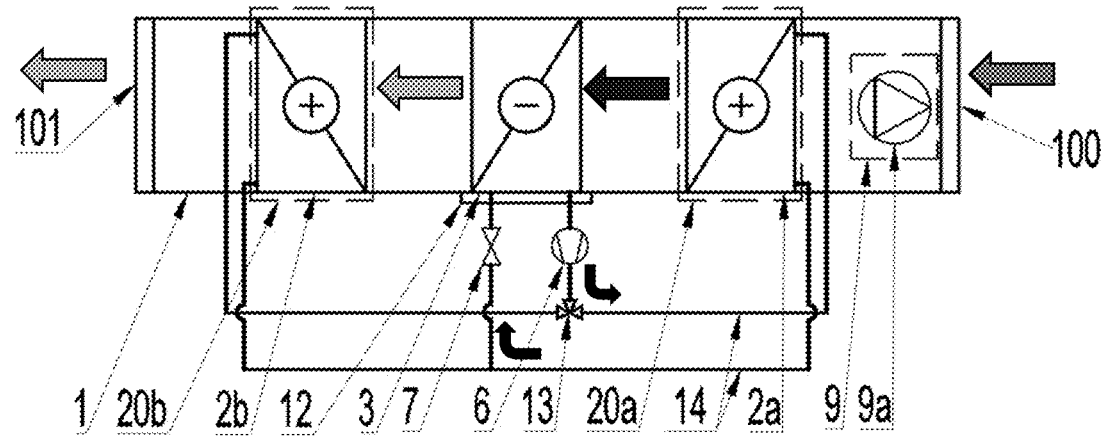

FIGS. 1 and 2 depict the simplest exemplary embodiment of the apparatus for extracting water from air with one air duct. An air duct 1 is shown having a first opening 100 for air intake and/or exhaust and also a second opening 101 for air intake and/or exhaust. In this air duct 1 are positioned: a main cooler 3 for cooling the air in the air duct 1 and a first block 20a of exchangers, generally comprising at least one first sorption exchanger 2a. FIG. 1 depicts an embodiment with just one first sorption exchanger 2a. In the sorption exchanger discharging phase, or in other words in the phase of water vapor desorption from the exchanger, it is necessary for the air passing through this exchanger to be heated. This can be ensured either by an upstream positioning of at least one air heating device or even more advantageously by an integrated heating within the first sorption exchanger 2a, which is one of the new features of the present invention allowing an even more compact design. Optionally, both types of heating of the air passing through the first sorption exchanger 2a can be combined, as seen in FIGS. 4 to 7, wherein the first sorption exchanger 2a has integrated heating and is also preceded upstream by an entering air heating device in the form of a first heater 4a. In the case of several first sorption exchangers 2a, at least one of these first sorption exchangers 2a has an integrated heating and/or upstream of these first sorption exchangers 2a at least one heating device is positioned to heat the entering air. If a heating device for heating the entering air is provided upstream, only some or none of the first sorption exchangers 2a may have integrated heating.

An example of a sorption exchanger suitable for the integrated heating is a lamellar exchanger coated with a desiccation layer. A thin layer of desiccant material is applied to all lamellas of the exchanger. Air flows between the individual lamellae, humidified during regeneration and dehumidified during adsorption. Typically, between the lamellae, the heat transfer fluid or coolant also flows in stainless steel or copper pipes, depending on the heat source.

The integrated heating of sorption exchangers can be provided by refrigerant, heat transfer fluid or electrically. One possibility is to provide heating with a flowing heat transfer fluid, which can advantageously be heated in the liquid solar collectors 16, as will be described below in relation to FIG. 7. However, the heating options are, of course, many others.

The said first block 20a of exchangers is air-interconnected directly or via other elements to the first opening 100 of the air duct 1. The apparatus also comprises a suction unit 9 for drawing air into the air duct 1, this suction unit 9 also comprising at least one suction device designated in FIG. 1 as 9a, and which is adapted to switch between two different directions of air suction into the air duct 1. This can be achieved, for example, by fitting the suction unit 9 with one suction device 9a switching two suction directions, as shown in FIGS. 1 to 4, or in other embodiments, see FIGS. 5 to 7, by fitting the unit 9 with two suction devices 9a, 9b. However, two suction devices can also be in the embodiments according to FIGS. 1 to 4, which is not shown. In this case, the first suction device 9a connected e.g., between the first opening 100 of the air duct 1 and the first block 20a of exchangers and the second suction device 9b may be connected e.g., between second opening 101 of the air duct 1 and the second block 20b of exchangers. The suction unit 9 can generally be positioned anywhere in the air duct 1, as long as it ensures the suction of air into this air duct.

The apparatus also comprises at least one element 12 for collecting condensed water, this in places where the water condenses, which is always on the main cooler 3, as shown in FIG. 1, but condensation may also occur in other places, e.g., in the recuperative heat exchanger 8, which can be seen in FIGS. 3 to 7, from where the condensed water is also collected. The element 12 for collecting condensed water can be a vessel, a pipe, etc.

One of the innovative elements of the apparatus is that it further comprises a second block 20b of exchangers with at least one sorption exchanger 2b located in the air duct 1 and air-connected directly or via other elements to the second opening 101 of the air duct 1. FIGS. 1, 2 show an embodiment wherein the second block 20b of exchangers comprises just one sorption exchanger 2b. The main cooler 3 is positioned in the air flow path between the first block 20a of exchangers and the second block 20b of exchangers, and that in both directions of air suction into the air duct 1.

Similarly to the first sorption exchanger 2a, it is required that the air passing through the second sorption exchanger 2b is heated when this second sorption exchanger 2b is discharging. This can be ensured either by an upstream positioning of at least one device for heating air entering the second sorption exchanger 2b or even more advantageously by integrated heating within the sorption exchanger 2b, which is one of the new features of the present invention allowing an even more compact design. Alternatively, it is also possible to combine both types of air heating, as can be seen in FIGS. 4 to 7, where the second sorption exchanger has an integrated heating and is also preceded upstream by an entering air heating device in the form of a second heater 4b. In the case of several second sorption exchangers 2b, at least one of these second sorption exchangers 2b comprises integrated heating and/or the second sorption exchangers 2b are preceded upstream by a device for heating the entering air. If an entering air heating device is provided upstream, only some or none of the second sorption exchangers 2b may have integrated heating.

The main cooler 3 may cool in various forms, e.g. it may be a thermoelectric cooler and/or, as shown in FIGS. 1 to 7, a refrigerant circuit may be included in the apparatus. The refrigerant circuit comprises a refrigerant piping 14, a refrigerant, an expansion valve 7 and a compressor 6 for drawing and compressing the evaporated refrigerant, to which the main cooler 3 is connected as a refrigerant evaporator. The main cooler 3 is also via the refrigerant piping 14 and a switching mechanism 13 for switching the refrigerant flow direction connected to the first block 20a of exchangers and to the second block 20b of exchangers. In the blocks 20a, 20b of exchangers, the air is heated by condensation of the refrigerant vapor. The two blocks 20a, 20b of heat exchanges are also interconnected by the refrigerant piping. Due to the presence of the refrigerant circuit connected in the manner as presented in the advantageous embodiments, heat can be advantageously recovered from cooling on the main cooler 3, connected as a refrigerant evaporator, to heat the air in the blocks 20a, 20b of exchangers, wherein the refrigerant vapor condenses. The air in the blocks 20a and 20b of exchangers is heated alternately, in other words, when air is heated in one of these blocks, air is not heated in the other, as will be explained using FIGS. 1 and 2. This last sentence also applies to an embodiment where heating and cooling are carried out in other ways than by means of a refrigerant circuit.

FIGS. 1 and 2 show mutually different air flow directions in the simplest embodiment of the apparatus. Although the cooling in the main cooler 3 and the heating of the air passing through the sorption exchangers 2a, 2b during their discharge may be implemented in different ways, we will now describe in more detail how these processes take place in an apparatus equipped with a refrigerant circuit. In FIGS. 1 to 4, the switching mechanism 13 for switching the refrigerant flow direction is in the form of a three-way valve. It can be seen in the said FIGS. 1 to 4 that the refrigerant piping 14 includes a branching in three directions, namely to the main cooler 3 via the compressor 6, to the first block 20a of exchangers and to the second block 20b of exchangers, wherein the switching mechanism 13 is implemented as a three-way valve, as mentioned.

Before starting the apparatus, the suction unit 9 is operated to charge both sorption exchangers 2a, 2b, followed then by the processes of alternating charging and discharging of the sorption exchangers 2a, 2b while at the same time producing water condensing on the main cooler 3.

In FIG. 1, the arrows indicate the directions of air and refrigerant flow during the discharge of the second sorption exchanger 2b or the second sorption exchangers 2b positioned in the second block 20b of exchangers. In this phase, the heating in the first block 20a of exchangers is switched off. In a solution with a refrigerant circuit, this is achieved by setting the switching mechanism 13 in such position that no refrigerant flows through the first block 20a of exchangers. The air enters the apparatus through the second opening 101, then passes through the second block 20b of exchangers, then the heated and humidified air enters the main cooler 3, where it is cooled to a temperature lower than the dew point temperature. The condensed water is collected by the water collecting element 12 under the main cooler 3. The dehumidified cold air then enters the second block 20a of exchangers, where the remaining humidity in the air is adsorbed. Then the air exits the apparatus through the first opening 100. Owing to the refrigerant circuit, heat from the cooling on the main cooler 3 can be advantageously recovered into the air entering through the second opening 101. The heating of the regenerating air in the second block 20b of exchangers is accomplished precisely due to this heat recovered from cooling on the main cooler. The discharge phase of the second sorption exchanger 2b ends when the specific humidity is the same upstream of the first block 20a of exchangers and downstream of this block exchanger. The apparatus may be equipped with sensors that measure this specific humidity at specified locations, or it can be programmed for known local conditions for a certain time interval, etc.

In FIG. 2 the arrows indicate the directions of air and refrigerant flow during discharging of the first sorption exchanger 2a or the first sorption exchangers 2a, which are in the block 20a of exchangers. In this phase, the heating in the second block 20b of exchangers is switched off, which in the embodiment with the refrigerant circuit means that no refrigerant flows in this phase through this block 20b. Compared to the previous FIG. 1, the air flow through the suction unit 9 is reversed and simultaneously the position of the switching three-way valve has changed, the refrigerant in this mode flows only to the first block 20a of exchangers. The air enters the apparatus through the opening 100, then passes through the first block 20a of exchangers, the heated and humidified air then enters the main cooler 3, where it is cooled to a temperature lower than the dew point temperature. The condensed water is collected by the water collecting element 12 under the cooler 3. The dehumidified cold air then enters the second block 20b of exchangers, where the remaining humidity in the air is adsorbed. Then the air exits the apparatus through the second opening 101. In this mode, due to the refrigerant circuit, the heat from cooling on the main cooler 3 is recovered into the air entering the apparatus through the first opening 100. The heating of the regenerating air in the first block 20a of exchangers is accomplished precisely due to this heat recovered from the cooling on the main cooler 3, when in the first block 20a the refrigerant vapors condense and thus the air is heated. The discharge phase of the first sorption exchanger or the first sorption exchangers 2a ends when the specific humidity is the same upstream of the second block 20b and downstream of this block. Also, in this part of the apparatus, sensors measuring this specific humidity at given locations may be installed, or the apparatus can be programmed for known local conditions for a certain time interval, etc.

It is therefore clear that in the apparatus whose two modes of operation are shown in FIGS. 1 and 2, a quasi-continuous water production from the air occurs owing to the alternating discharge of the sorption exchangers in the blocks 20a, 20b of exchangers. When switching from one mode to another, only the direction of air flow in the suction unit 9 is switched and the air heating in the block of exchangers where the sorption exchangers are being discharged is switched on alternately, whereas in the second block of exchangers this heating is switched off. In an apparatus with a refrigerant circuit, this can be achieved by switching the switching mechanism 13. Already when discharging one block of exchangers, the sorption exchangers in the second block of exchangers are partially recharged. The interval required for their subsequent full charging can be reduced to minimum by increasing the rotational speed of the suction device. Thus, we obtain a compact, energy-efficient, and effective apparatus. The concurrent use of two blocks 20a, 20b of exchangers, each of which comprises at least one sorption exchanger, significantly increases water production.

In FIGS. 3 to 7, other possible advantageous embodiments of the apparatus are extended by a recuperative heat exchanger 8, owing to which the required cooling power can be significantly reduced. The recuperative heat exchanger 8 is positioned in the air duct 1 between the main cooler 3 and the first block 20a of exchangers and simultaneously also between the main cooler 3 and the second block 20b of exchangers. The recuperative heat exchanger 8 has at least two internal conduits connected so that the first of these internal conduits air-interconnects the first block 20a of exchangers and the main cooler 3 and that the second of these internal conduits air-interconnects the main cooler 3 with the second block 20b of exchangers, the first and second internal conduits being in mutual thermal contact with each other. There may be several first and second internal conduits of the recuperation exchanger, in which case they are in the form of small-diameter channels and are arranged so that one first conduit is always in thermal contact with one of the second conduits. In this case then, each of the first internal conduits also air-interconnects the first block 20a of exchangers and the main cooler 3, and each of the second internal conduits air-interconnects the main cooler 3 to the second block 20b of exchangers. The air flow through the apparatus and specifically through the recuperative heat exchanger 8 is again demonstrated in FIGS. 3 to 7 by arrows, whereas the arrows at the recuperative heat exchanger are schematic, showing the flow direction and not the number of air flows in the outlined direction. This number may vary.

It can also be seen from FIGS. 3 to 7 that the air still flows through one air duct which is bent in the position of the cooler. The air duct 1 in FIG. 3, for example, starts at the first opening 100, where the air enters into it, and continues through the first block 20a of exchangers via the regenerative heat exchanger 8, which is inserted in the air duct 1, to the main cooler 3, from here the air rises through the said bend on the air duct 1 (arrow vertically upwards) again to the recuperative heat exchanger 8, through which it continues to the second block 20b of exchangers and through the second opening 101 out of the air duct 1. In the space delimited by the first and second openings 100, 101 on one side and the recuperative heat exchanger 8 on the other side, the air duct 1 is divided by a partition into two parts to separate the air flow coming from the first opening 100 and exiting into the second opening 101.

Figure 3:
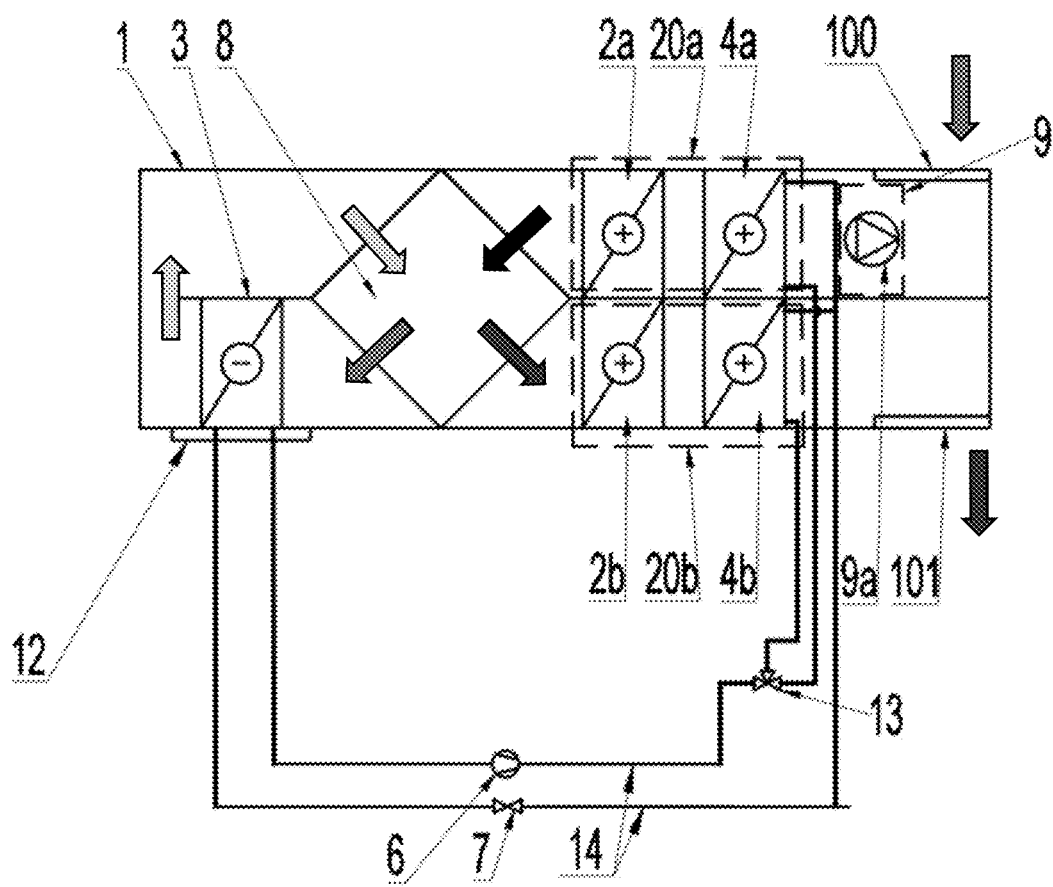
FIG. 3 differs from FIG. 4 in the reverse direction of flow through this air duct 1.

FIG. 3 demonstrates an example in which the sorption exchangers 2a, 2b are not connected to a refrigerant circuit. However, their integrated internal heating can still be applied, e.g. electric resistance heating, and thus increase the discharge efficiency of the exchanger. The sorption exchangers 2a, 2b are preferably lamellar. The first sorption exchanger 2a is preceded upstream by the first heater 4a for heating the air entering this sorption exchanger 2a to a higher temperature during its discharge. The first heater 4a is connected to the refrigerant circuit as a refrigerant vapor condenser. Similarly, the second sorption exchanger 2b is preceded upstream by the second heater 4b for heating the air entering this second sorption exchanger 2b to a higher temperature when discharging this second sorption exchanger. The heaters 4a, 4b can be, for example, heat exchangers with a heating coil or they can be liquid water exchangers with electric heating, but it is most advantageous to heat the air on the heaters 4a, 4b by using refrigerant condensing in the refrigerant circuit, as will be described below. In this case, the heaters 4a, 4b are usually lamellar and the refrigerant piping passes through the lamellas.

The first heater 4a together with the first sorption exchanger 2a are part of the first block 20a of exchangers and similarly the second heater 4b is together with the second sorption exchanger 2b part of the second block 20b of exchangers, and similar. The heaters 4a, 4b are, in the embodiment according to FIGS. 3 to 7, refrigerant-air exchangers. It can be seen that the first block 20a of exchangers is the first heater 4a connected by refrigerant piping 1 to the refrigerant the switching mechanism 13 and that the second block 20b is connected via the second heater 4b also connected by the refrigerant piping 14 to the refrigerant switching mechanism 13. The mutual interconnection of the blocks 20a, 20b of exchangers by refrigerant piping 14 is implemented as a mutual interconnection of the heaters 4a, 4b.

FIG. 3 shows the flow direction during the discharge of the first sorption exchanger 2a. The air enters the apparatus through the first opening 100, then passes through the first air heater 4a, is subsequently additionally heated to the required regeneration temperature by the first sorption exchanger 2a with an internal energy source, which simultaneously expels water molecules from its surface and humidifies the air. The humid hot air then enters the first conduit or conduits of the recuperative exchanger 8 in the direction of the arrows pointing from top right to down left. In the recuperative heat exchanger 8 it is precooled through cold recovery from the air flow returning through the second conduit or the second conduits of the recuperative heat exchanger 8 from the main cooler 3 (in FIG. 3, arrows pointing from top left to down right), and is subsequently cooled on the cooler 3 to a temperature lower than the dew point temperature. The condensed water is captured by the water collecting element 12 under the cooler. The dehumidified cold air then enters the second conduit or conduits of the recuperative heat exchanger 8. The air further passes through the second block of exchangers, which has the heating switched off at this phase and through the second opening 101 of the air duct 1 out of this air duct.

Figure 4:
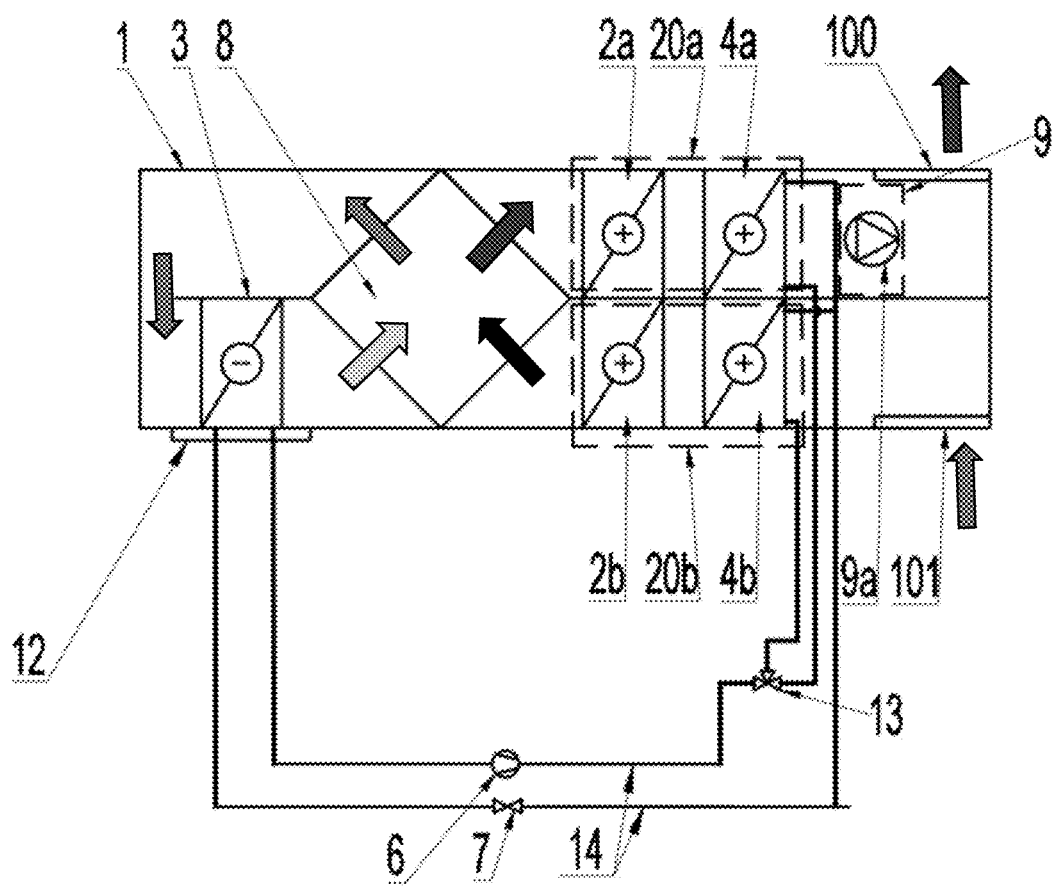
FIG. 4 depicts a situation in which the second sorption exchanger 2b in the second block 20b of exchangers is discharged.

Similar to the embodiment according to FIGS. 1 and 2, also the embodiment in FIGS. 3 and 4 operates in two modes. In the first, the first sorption exchanger or the first sorption exchangers 2a are discharged, in the second mode the second sorption exchanger or the second sorption exchangers 2b are discharged. Each time the heating is switched on in that block of exchangers in which the sorption exchanger or exchangers are being discharged, and heating is switched off in the second block of exchangers. The heating is switched on by switching the switching mechanism 13, which closes the refrigerant flow with respect to one block of exchangers (thus the heating of this block of exchangers is switched off) and opens the refrigerant flow with respect to the second block of exchangers (and the heating of this block of exchangers is switched on). Also, when changing the mode, the direction of air flow through the air duct 1 changes by means of the suction unit 9. Thus, in the discharging mode of the second sorption exchanger 2b shown in FIG. 4, air will enter the apparatus through the second opening 101 and exit through the first opening 100, as a result of which the air flow directions in the recuperative heat exchanger and around the cooler are reversed.

Figure 5:
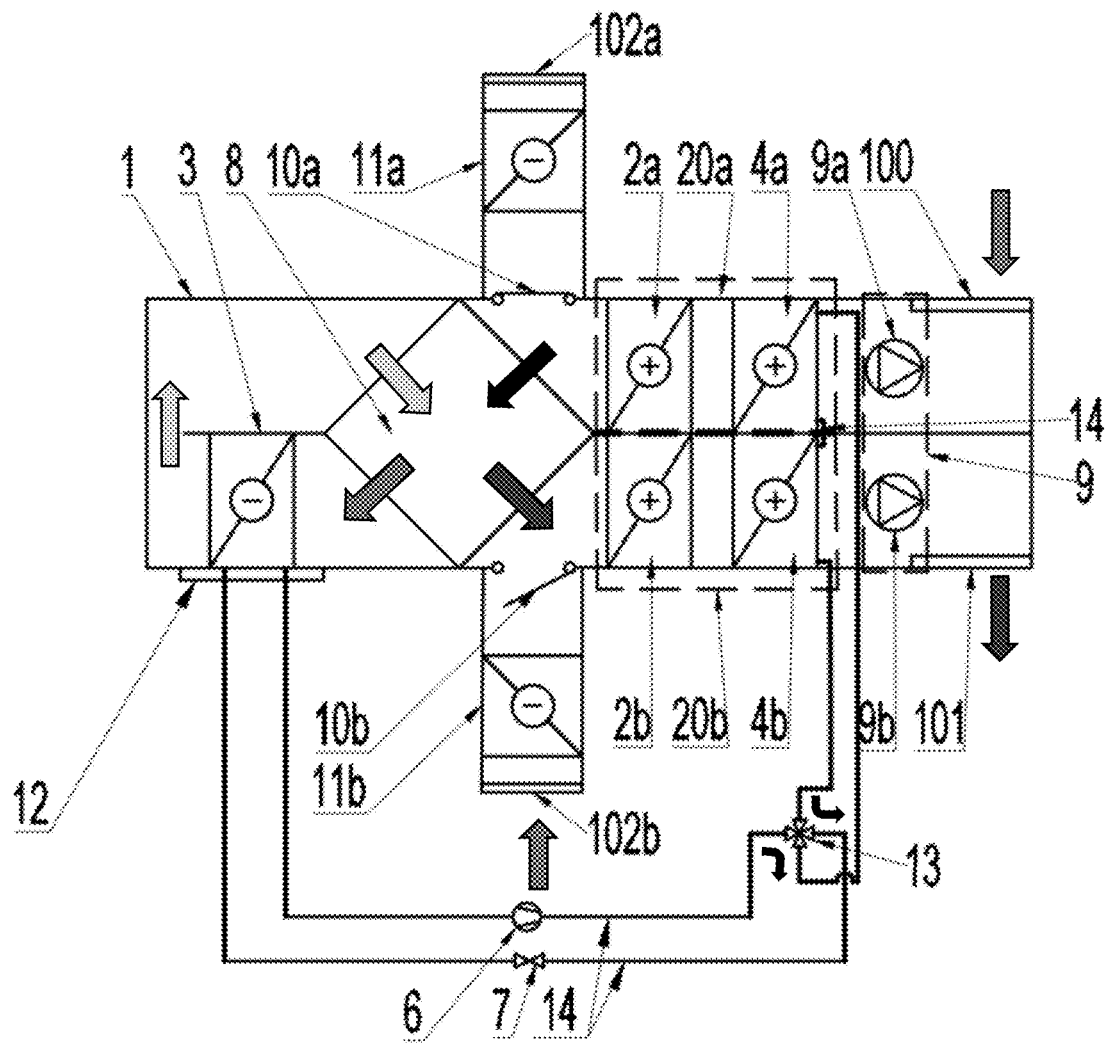
FIGS. 5 and 6 again depict, for opposite flow directions, a more complex apparatus with a different refrigerant circuit switching, with flaps 10a and 10b and other optional elements added.
Figure 6:
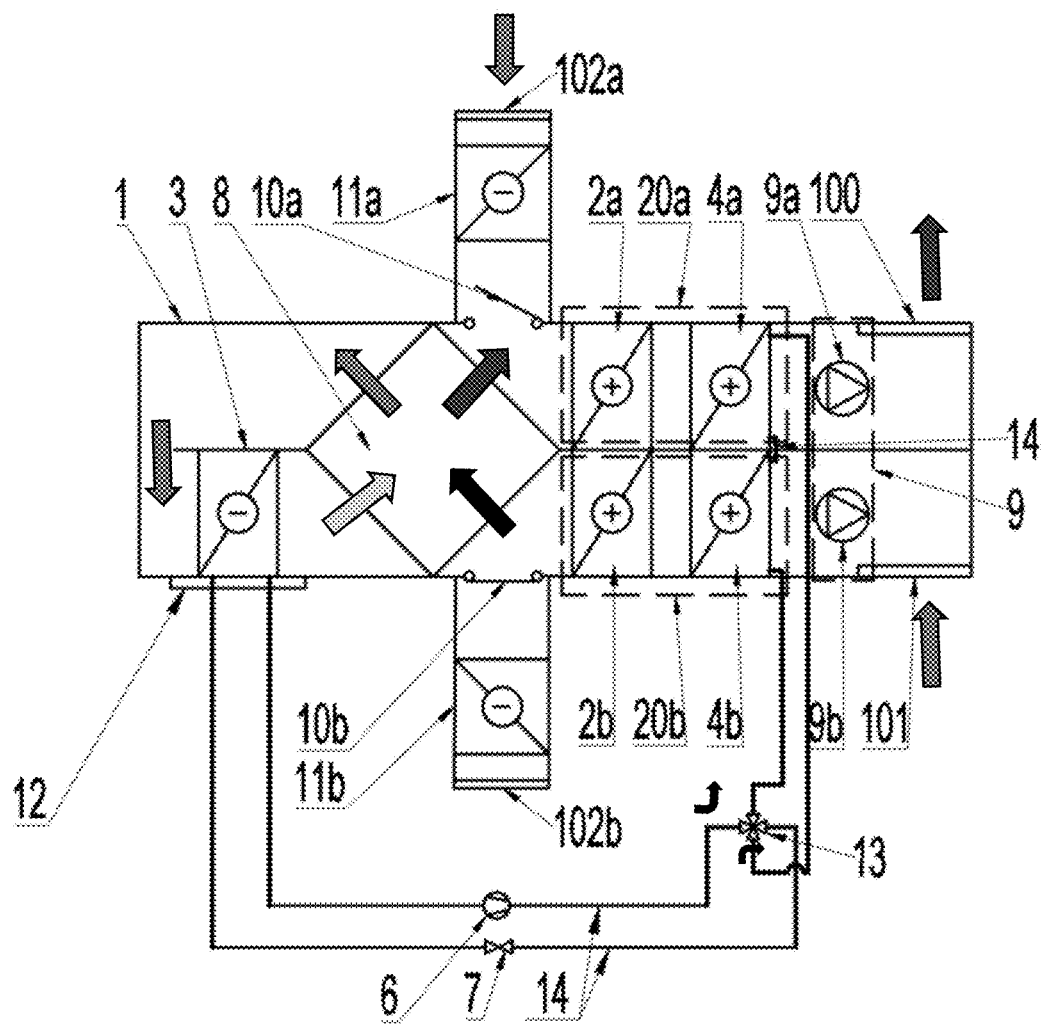

A slightly more complex, but again even more efficient, embodiment is shown in FIGS. 5 and 6, where FIG. 5 represents the discharge of the first sorption exchanger 2a and FIG. 6 the discharge of the second sorption exchanger 2b. In these figures, for the sake of simplicity, we will describe the situation with only one first sorption exchanger 2a and with only one second sorption exchanger 2b, although the number of first and second sorption exchangers may generally be higher.

In this case, the refrigerant piping comprises a branching in four directions, namely to the main cooler 3 via the compressor 6, to the main cooler 3 via the expansion valve 7, to the first air heater 4a and to the second air heater 4b, wherein at the location of this branching in four directions the switching mechanism 13 designed this time as a four-way valve is implemented.

Due to the use of a four-way valve, the cooling power and thus water production can be maximized. Because the heat power pumped by the refrigerant circuit may be greater than the power required to heat the regenerating air on the first heater 4a (with air flow in the direction according to FIG. 3), in the refrigerant piping 14, in series downstream of the heater 4a, a second heater 4b is connected, functioning as a subcooler for additional heat removal from the refrigerant. In general, the excess heating power is removed on such heater 4a, 4b, that is included in the block 20a, 20b, where the sorption exchanger is not being discharged, so that in FIG. 4 the first heater 4a is connected as the subcooler. The aftercooling exchanger heats the air exiting the recuperative heat exchanger 8. The aftercooling exchanger is connected by the refrigerant piping via the expansion valve 7 to the cooler 3.

In the embodiment with a four-way valve, the refrigerant always flows through both heaters 4a and 4b, only the flow direction changes.

At the same time, in the embodiments according to FIGS. 5 and 6, flaps are used making it possible to increase the flow upstream of the just switched off sorption exchanger and thus speed up the adsorption process. The embodiment with flaps now enables completely continuous water production, it is not necessary to wait between switching the modes and flow directions for one of the sorption exchangers to fully charge, because when discharging e.g. the first sorption exchanger 2a, the second sorption exchanger 2b is being fully charged, and vice versa. In the embodiments according to FIGS. 1 to 4, after switching the modes, it is always necessary to wait a certain time before the air humidity is fully adsorbed on the surface of the sorption exchanger 2a or 2b, that will be discharged in the next phase, even if this waiting time is minimal compared to the solution e.g., according to WO 2016/187709. The explanation of minimizing the waiting time is based on the fact that e.g., at the flow directions shown in FIGS. 1 and 4, the adsorption of atmospheric humidity on the surfaces of the first sorption exchanger 2a occurs to some extent already during the discharge of the second sorption exchanger 2b, since the first sorption exchanger 2a captures residual humidity after condensation of water on the main cooler 3. In a mirror situation, the residual humidity is then collected on the second sorption exchanger 2b in the flow directions according to FIGS. 2 and 3.

Figure 7:
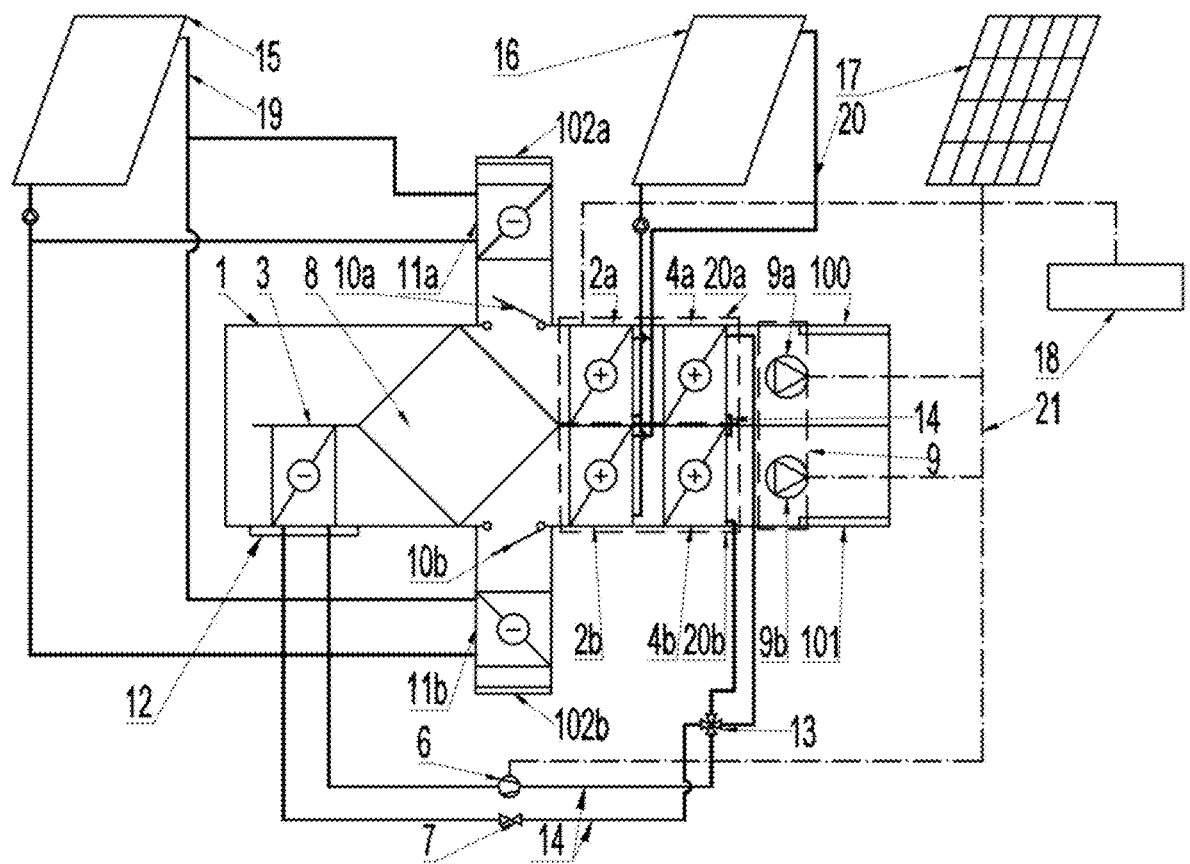
In FIG. 7, the apparatus is supplemented with elements enabling autonomous operation.

In FIGS. 5 to 7 it can be seen that the air duct 1 is provided with the first flap 10a for air connection to the exterior positioned between the first block 20a of exchangers and the recuperative heat exchanger 8. The air duct 1 in these figures is also equipped by the second flap 10b, for air-interconnection with the exterior, positioned between the second block 20b of exchangers and the recuperative heat exchanger 8. However, an embodiment is also possible in which only one of the flaps 10a, 10b is used.

The suction unit 9 may, in addition to the first suction device 9a comprise also a second suction device 9b. In this case, the first suction device 9a connected between the first opening 100 of the air duct 1 and the first block 20a of exchangers and the second suction device 9b is connected between the second opening 101 of the air duct 1 and the second block 20b of exchangers. The second suction device 9b could thus also be positioned in the embodiments according to FIGS. 1 to 4 where it is not shown. However, it is most advantageous for use in the embodiments according to FIGS. 5 to 7, due to the operation of the flaps 10a, 10b.

If there is only one suction device in the apparatus, e.g., only the first suction device 9a, one flap can be used to increase the flow during the adsorption, in this example it would be the first flap 10a. If the suction unit 9, comprise two suction devices, in FIGS. 5 to 7 the first suction device 9a and the second suction device 9b, both flaps 10a, 10b can be used.

It is advantageous to position between the first flap 10a and the exterior a first supplementary cooler 11a for pre-cooling the exterior air and/or position between the second flap 11b and the exterior a second supplementary cooler 11b for pre-cooling the exterior air. None, one or both of these supplementary coolers 11a, 11b can be used. The supplementary coolers 11a, 11 b are designed as liquid-air coolers and can significantly reduce the energy consumption of the apparatus.

In FIG. 5, the directions of air and refrigerant flow during the discharge of the first sorption exchanger 2a are indicated. The air enters the apparatus through the first opening 100 of the air duct 1, then passes through the first heater 4a, is subsequently additionally heated to the required regeneration temperature by the first sorption exchanger 2a with an internal energy source, which simultaneously expels water molecules from its surface and humidifies the air. The humid hot air then enters the recuperative heat exchanger 8, where it is pre-cooled and subsequently additionally cooled on the cooler 3 to a temperature lower than the dew point temperature. The condensed water is collected by the water collecting element 12 under the cooler 3, followed, similarly to the embodiments according to FIGS. 3 and 4, by the passage through the recuperation exchanger towards the second block 20b of exchangers. Due to the fact that the second flap 10b is open and the second suction device 9b draws air from the exterior through a second supplementary opening 102b and routes this exterior air also to the second block 20b of exchangers, the second sorption exchanger 2b is being fully charged already during the discharge process of the first sorption exchanger 2a. It is obvious, that this charging is even more efficient in the presence of the second supplementary cooler 11b downstream of the second supplementary opening 102b.

FIG. 6 then illustrates the opposite flow of air through the apparatus than in FIG. 5. In this case, the second sorption exchanger 2b is discharging and due to the opening of the first flap 10a and the air suction by the first suction device from the first supplementary opening 102a towards the first opening 100, the first sorption exchanger 2b is being concurrently charged. Similarly to the previous mode, this charging is even more efficient due to the presence of the first supplementary cooler 11a downstream of the first auxiliary opening 102a.

The apparatus in FIGS. 5 and 6 also, with an advantage, comprises a refrigerant circuit, which operates analogously as in the embodiments according to FIGS. 3 and 4.

FIG. 7 then includes the most complex embodiment of the apparatus, which is extended by other elements allowing autonomous operation. FIG. 7 thus shows an air conduit 19, air solar collectors 15, a photovoltaic panel 17, a battery storage 18, an electrical interconnection 21, liquid solar collectors 16 and liquid piping 20. However, only selected elements can be used.

In the complex embodiment according to FIG. 7, it can be seen that the supplementary coolers 11a, 11b are connected by air conduits 19 to the air-heating solar collectors 15. The apparatus may also comprise one or more photovoltaic panels 17, the battery storage 18 being electrically connected to at least one of these photovoltaic panels 17. An alternative is some other renewable source, such as a wind farm, or any other local electricity generator, even with a non-renewable energy source. The apparatus may comprise one or more liquid solar collectors 16, the liquid solar collectors 16 being thermal and/or photovoltaic-thermal. In the case that photovoltaic-thermal collectors are present, these photovoltaic-thermal collectors are electrically interconnected to the battery storage 18. Each of the liquid solar collectors 16 is interconnected by liquid piping 20 to the first block 20a of exchangers and to the second block 20b of exchangers. The liquid used in the liquid piping can be, for example, water, but also some other liquid.

In the embodiment according to FIG. 7, energy for the operation of the apparatus is supplied, inter alia, from photovoltaic (abbreviated as PV) panels 17, storing electrical energy in the battery storage 18. If there is enough stored electrical energy in the battery storage 18, air solar collectors 15 can be advantageously used during night operation. Under clear night skies, the air entering the apparatus can be cooled by radiation against the cold sky. This can significantly reduce the energy consumption of the apparatus. Operation during the night is also advantageous in terms of water production because the specific humidity in desert conditions reaches higher values at night than during daylight hours. For the day mode, liquid solar collectors 16 can be used, they may be thermal or photovoltaic-thermal, or possibly photovoltaic-thermal and glazed. These liquid solar collectors 16 are connected by the liquid piping 20 to the sorption exchangers 2a, 2b.

Thus, the apparatus devised in this way ensures continuous production of water with low energy consumption even in dry and often extremely hot desert conditions during the day, in addition it is mobile and can operate completely autonomously without connection to external energy sources.

INDUSTRIAL APPLICABILITY

The apparatus is advantageous to use especially in desert areas where the specific humidity is low. The apparatus according to the present invention is small in size, i.e. easy to transport. This is one of the reasons why its use in humanitarian crises or armed conflicts is also suggested. The apparatus can be operated autonomously without the use of non-renewable energy sources, or with a local energy source without a connection to the distribution network.

What is claimed is:

1. An apparatus for extracting water from air with one air duct, comprising:
   an air duct having a first opening for air intake or exhaust and also a second opening for air intake or exhaust;
   a first block of exchangers comprising at least one first sorption exchanger positioned in the air duct, air-interconnected to the first opening;
   wherein at least one of the first sorption exchangers comprises integrated heating or the first sorption exchangers are preceded by at least one device for heating the entering air;
   a suction unit configured to draw air into the air duct, comprising at least one suction device and at least one vessel or pipe for collecting condensed water, wherein the suction unit is adapted to switch between two different directions of air suction into the air duct
   a second block of exchangers with at least one second sorption exchanger positioned in the air duct and air interconnected to the second opening of the air duct; and a main cooler configured to cool air in the air duct, positioned in the air duct in an air flow path between the first block of exchangers and the second block of exchangers;

wherein at least one of the second sorption exchangers comprises integrated heating or the second sorption exchangers are preceded by at least one device for heating the incoming air.

2. The apparatus of claim 1, comprising:

a refrigerant circuit comprising refrigerant piping, a refrigerant, an expansion valve, and a compressor;

wherein the main cooler is connected to the refrigerant circuit as a refrigerant evaporator;

wherein the first block of exchangers and the second block of exchangers are connected to the refrigerant circuit via the refrigerant piping and a refrigerant flow switching mechanism, both blocks of exchangers being also interconnected by the refrigerant piping.

3. The apparatus of claim 2, wherein the first block of exchangers also comprises a first heater;

wherein the second block of exchangers comprises a second heater;

wherein the first block of exchangers is connected via the heater and the refrigerant piping to the switching mechanism; and wherein the second block of exchangers is connected via the heater and the refrigerant piping to the switching mechanism.

4. The apparatus of claim 3, wherein the refrigerant piping comprises a junction fluidly connected in a first branch to the main cooler via the compressor, in a second branch to the main cooler via the expansion valve, in a third branch to the first air heater and in a fourth branch to the second air heater;

the apparatus further comprising a four-way valve positioned at the junction and configured as a switching mechanism.

5. The apparatus of claim 2, wherein the refrigerant piping comprises a junction fluidly connected in a first branch to the main cooler via a compressor, in a second branch to the first block of exchangers and in a third branch to the second block of exchangers;

the apparatus further a three-way valve positioned at the junction and configured as a switching mechanism.

6. The apparatus of claim 1, comprising:

a recuperative heat exchanger positioned in the air duct between the main cooler and the first block of exchangers and simultaneously positioned between the main cooler and a second block of exchangers;

wherein the recuperative heat exchanger comprises at least first and second internal conduits in thermal contact with one another, wherein the first internal conduit fluidly connects the first block of exchangers to the main cooler and that the second internal conduit fluidly connects the main cooler to the second block of exchangers.

7. The apparatus of claim 6, wherein the air duct comprises a first flap for air-interconnection to the exterior, positioned between the first block of exchangers and the recuperative heat exchanger, or wherein the air duct comprises a second flap for air-interconnection to the exterior, positioned between the second block of exchangers and the recuperative heat exchanger.

8. The apparatus of claim 7, further comprising a first auxiliary cooler for pre-cooling the exterior air positioned between the first flap and the exterior.

9. The apparatus of claim 8, comprising air-heating solar collectors and an air conduit, the first auxiliary cooler being connected by the air conduit to the air-heating solar collectors.

10. The apparatus of claim 1, wherein the suction unit comprises a first suction device and a second suction device, wherein the first suction device is connected between the first air duct opening and the first block of exchangers and wherein the second suction device is connected between the second opening of the air duct and the second block of exchangers.

11. The apparatus of claim 1, comprising a battery storage and at least one photovoltaic panel, the battery storage being electrically connected to at least one of the photovoltaic panels.

12. The apparatus of claim 1, comprising at least one thermal or photovoltaic-thermal liquid solar collector.

13. The apparatus of claim 12, comprising a liquid piping, wherein each of the liquid solar collectors is interconnected by this liquid piping to the first block of exchangers and to the second block of exchangers.

14. The apparatus of claim 12, comprising at least one photovoltaic-thermal liquid solar collector, wherein the photovoltaic-thermal liquid solar collector electrically connected to the battery storage.

* * * * *